Dec. 26, 1961 P. ROBINSON 3,015,051
ELECTRICAL CAPACITOR
Filed Jan. 25, 1957

INVENTOR.
PRESTON ROBINSON
BY
HIS ATTORNEYS 3,015,051
ELECTRICAL CAPACITOR
Preston Robinson, Williamstown, Mass., assignor to Sprague Electric Company, North Adams, Mass., a corporation of Massachusetts
Filed Jan. 25, 1957, Ser. No. 636,437
3 Claims. (Cl. 317—258)

This invention relates to electrical capacitors, more particularly to alternating current electrostatic capacitors, and still more particularly to such capacitors having the interelectrode space substantially filled with liquid impregnants of high dielectric constant. This application is a continuation in part of my copending application S.N. 329,080 filed December 31, 1952, and later abandoned.

The electrostatic capacitor art has long recognized that capacity per unit volume could be improved by filling the interelectrode space in a capacitor with materials, notably liquids, of high dielectric constant. Generally speaking however these liquids have not been found satisfactory because of their high electrical conductivity which results in high leakage and poor power factor.

Among the objects of this invention is the provision of capacitors which can utilize liquids of high dielectric constant without suffering from the high electrical losses usually associated therewith.

Another object of the invention is to provide means for maintaining the interelectrode space of a capacitor filled with a liquid of high dielectric constant in such a manner that high electrical losses will not be experienced.

Figure 1:
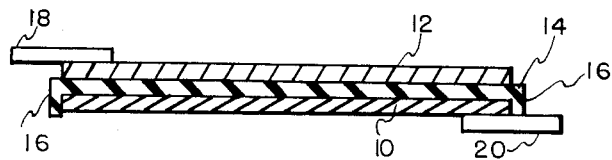
Figure 2:
Figure 3:
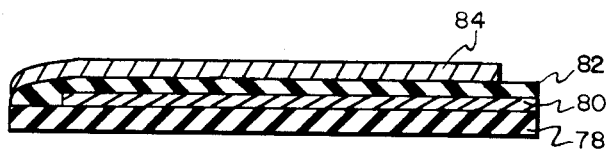

The above as well as still further advantages of the present invention will be more clearly understood from the following description of several of its exemplifications considered along with the accompanying drawings wherein:

FIG. 1 is a sectional view illustrating the essential elements of a capacitor embodying the present invention; and, FIGS. 2 and 3 are views similar to FIG. 1 showing modified forms of capacitors according to the present invention.

The objects of this invention are attained by providing a capacitor structure in which the interelectrode space is much less than the excursion distance of the ions of the high dielectric constant liquid. As an aid to attaining this goal, organic and inorganic porous spacers of extremely small thickness have been utilized.

The preferred liquid for use in these capacitors is water because of its high dielectric constant, which ranges between approximately 55 at 100° C. to approximately 88 at 0° C., and which is approximately 80 at the normal operating temperature of 20° C. Since water is distilled easily and is unchanged by distillation, distilled water is preferably employed because it does not carbonize. Water is also preferred because it has an extremely low number of ions present as a result of dissociation, approximately one molecule in $5 \times 10^8$ dissociates into ions, and hence does not readily enter into ionization by collision.

A liquid of dielectric constant above 50, such as water, may be utilized only if the motion of its ions in an alternating field is impeded by the presence of solid boundaries such as either the electrodes themselves, or by walls of the pores of a porous spacer material. The ions responsible for electrical conductivity only contribute to electrical losses, such as high leakage resistance and high power factor, if the extent of motion of these ions under the influence of an A.C. field is less than the distance between the electrodes. If the distance between the electrodes is much less than the excursion, or extent of motion of the ions, then the ions are immobolized on the electrodes during a large part of the A.C. cycle and thus do not give rise to losses, because the conductivity occasioned by ionization by collision has been avoided.

Referring to FIG. 1 there is here shown a pair of metal foils 10, 12 sandwiched about a dielectric spacing film 14. For the purpose of the present invention, film 14 is less than 0.1 mil thick, and preferably less than 0.01 mil thick in order to immobilize the ions of the impregnant, and is impregnated with a high dielectric liquid such as distilled water. The film is readily made by casting a solution of a resin, such as cellulose nitrate, on the surface of a liquid, such as water. By way of example, cellulose nitrate of 1000 centipoises viscosity (pyroxylin) can be dissolved to form a 5% solution in methyl isobutyl ketone, with 2% camphor and 3% castor oil added as plasticizers if desired. A small quantity of this solution can then be dropped on the surface of a body of water held in a suitable container, with the solution permitted to spread over the surface of the water before the solvent evaporates. Evaporation takes place relatively rapidly and is complete in about one to three minutes. Only about 0.2 to 0.4 of a milliliter of this solution is all that need be used to form a film $10 \times 50$ centimeters in size and about 0.05 mils thick. Thinner or thicker films can be made by decreasing or increasing the concentration of the resin in the solution.

The resulting film which remains floating on the surface of the water can be transferred to any support, such as foil 10, by placing the foil in the water below the film and permitting the water to flow out of its container from below the level of the foil. For better stretching of the film over the foil, the foil can be held in a vertical plane as the water is run out so that one edge of the film is lowered onto the foil first, and the remainder of the film gradually attaches itself to the foil as the water level drops.

The film 14 can be arranged to cover the edges of foil 10 as by making it sufficiently large to leave flanges 16 extending beyond the margins of foil 10. The sandwich is completed by superimposing another foil 12 over the film 14. Terminals 18, 20 can be secured to the respective foils to act as leads for the capacitor.

Impregnation of the pores of the film may be accomplished by vacuum impregnation, which is conventional in the capacitor art, or by dipping the film coated electrodes into the dielectric liquid.

Other porous resins can be employed in place of the cellulose nitrate. For example, cellulose acetate, regenerated cellulose, polyvinyl chloride, polyethylene, polytetrafluoroethylene, polymethylmethacrylate, polyacrylonitrile, copolymerized butadienestyrene, polystyrene, epoxyline resins, polyesters. Other casting solvents can also be used in place of the methyl isobutyl ketone. In any event, the cast film, regardless of the type of resin used, is sufficiently porous that an appreciable amount of the high dielectric liquid is absorbed, and the capacitance of the resulting unit is significantly increased. At the same time, the power factor of the assembly will be below 0.2%, even though the resin is one having a notoriously poor power factor, such as copolymerized butadienestyrene.

It should be understood that the porous spacer of this invention may be composed of inorganic material as well as the above-mentioned organic resins. A suitable inorganic spacer is prepared by coating an electrode with silicon monoxide, by means of vacuum metallization techniques, and then exposing the coating to air, in order to oxidize the monoxide to a hard porous film of silicon dioxide.

Another suitable embodiment of porous spacers which may be utilized in this invention are films of materials which absorb water to form a gel-like mass. Suitable films of this embodiment are polyvinyl alcohol and carboxymethyl cellulose. Films of these resins can be made with non-aqueous, hydrophylic casting liquids that have little or no solvent action toward the resin. These hydrophylic resins, and even hydrophobic resins for that matter, can also be cast on liquids other than water, where these liquids have very little solvent action toward the resin.

The resin films of the present invention can also be cast directly on the electrode foil with which it is used. By using a dilute casting solution that is effectively spread over the surface of the foil before the resin solvent is evaporated, the desired thin films are immediately obtained.

As an alternative to the use of distinct foils which are coated with films, satisfactory results are obtained by providing a metallic coating on the surface of these very thin films. A satisfactory metallization of these films may be accomplished by the use of the gold deposit techniques of Harris and Beasley, described in Journal of the Optical Society of America, vol. 42, p. 134 (1952). Briefly, gold-smoke deposits are obtained according to this process when gold is evaporated from a tungsten filament in a nitrogen atmosphere containing about 1% or more of oxygen. Under such conditions tungsten oxides are formed at the evaporating filament and are deposited along with the gold. Gold black deposits, on the other hand, are obtained when the residual oxygen in the nitrogen atmosphere is first removed; such deposits consist almost entirely of pure gold.

Conventional metal coatings of zinc, aluminum or lead may be applied by spraying, sputtering or distillation, provided that a barrier layer, such as cellulose acetate nitrate, has been applied to the surface of the thin film of porous spacing material.

FIG. 2 illustrates a capacitor combination of this type. Here a base 50 which may be a metal foil of relatively large thickness such as the 0.5 mil thick aluminum normally used in capacitor manufacture, has a dielectric film 60 cast on one of its surfaces. After casting, the exposed surface of film 60 is covered with a coating 70 of zinc, aluminum or lead, sprayed in place using a mask or stencil to keep the sprayed metal from approaching the edges of film 60. Terminals for the electrodes 50, 70 can then be suitably secured as by spraying to the respective electrodes. The film 60 can be impregnated in the same manner indicated above in connection with the construction of FIG. 1.

FIG. 3 shows a modified form of capacitor arrangement in which a thin dielectric 82 in accordance with the present invention is applied along with cooperating electrodes 80, 84 on an electrically non-conductive base 78. The electrode 80 as well as the cooperating electrode 84 can either be applied as a preformed foil which is laminated in place, or they can be in the form of metal coatings such as the sprayed-on type. Film 82 can be cast directly in place or else supplied from a separately cast condition. The completed combination can be convolutely wound in the regular manner for making wound capacitors, and terminals can then be connected to the exposed edges of the wound unit, as by spraying metal over the edges to make contact with the respective foil margins. It is noted that the metal layers 80, 84 can be laterally offset with respect to each other so that the terminal connections do not short circuit them.

Impregnation can be effected before or after the terminals are connected in place, and before or after the various laminations are assembled. Where the impregnation follows the application of the terminals, a sufficient amount of each side of the winding should be kept exposed, that is not covered by the terminal connecting elements, to leave a substantial passageway for the impregnant to penetrate into the dielectric films.

The constructions of FIGS. 1 and 2 can also be convolutely wound if desired. For this purpose an additional stratum of insulation or capacitor dielectric is laminated with the assembly shown in these figures, and the combination rolled up as described in connection with FIG. 3. The additional stratum can be another one of the very thin dielectric films such as that shown at 14 or 60. Alternatively, the additional stratum can be a relatively thick or more sturdy film or ribbon.

On the other hand, the construction of FIG. 3 can be used in unrolled or flat form by merely attaching leads to it as described in connection with FIG. 1 for example.

As many apparently widely different embodiments of the invention may be made without departing from the spirit and scope thereof, it is to be understood that this invention is not limited to the specific embodiments hereof except as defined in the appended claims.

What is claimed is:

1. An alternating current capacitor comprising imperforate electrodes capable of being subjected to an alternating field, said electrodes being separated by a porous spacer impregnated with water, the separation of said electrodes being substantially less than the excursion distance of the ions of water.

2. The capacitor of claim 1 in which said spacer is a porous resin film.

3. An alternating current capacitor comprising an electrically non-conductive base, an imperforate electrode in intimate contact with said base, a cast porous resin film providing a spacer between said electrode and a second imperforate electrode, said spacer being impregnated with distilled water, separation between said electrode and said second electrode being substantially less than the excursion distance of the water ions.

References Cited in the file of this patent

UNITED STATES PATENTS

| | | |
|---|---|---|
| 1,895,376 | Clark | Jan. 24, 1933 |
| 1,960,415 | Miller | May 29, 1934 |
| 2,009,520 | Reisz | July 30, 1935 |
| 2,211,019 | Lommel | Aug. 13, 1940 |
| 2,307,488 | Clark | Jan. 5, 1943 |
| 2,531,389 | Brandt | Nov. 28, 1950 |
| 2,798,990 | Davis | July 9, 1957 |
| 2,908,593 | Naidus | Oct. 13, 1959 |

FOREIGN PATENTS

| | | |
|---|---|---|
| 426,874 | Great Britain | Apr. 11, 1935 |